United States Patent [19]
Ozaki et al.

[11] Patent Number: 4,883,420
[45] Date of Patent: Nov. 28, 1989

[54] DIE FOR EXTRUDING HONEYCOMB STRUCTURAL BODIES

[75] Inventors: Sei Ozaki, Aichi; Satoru Inoue, Hazu; Shoji Futamura, Kawasaki, all of Japan

[73] Assignee: NGK Insulators, Ltd., Nagoya, Japan

[21] Appl. No.: 240,446

[22] Filed: Sep. 2, 1988

Related U.S. Application Data

[63] Continuation of Ser. No. 942,408, Dec. 16, 1986, abandoned.

[30] Foreign Application Priority Data

Dec. 18, 1985 [JP] Japan ............................. 60-284571

[51] Int. Cl.[4] ............................................ B29B 47/12

[52] U.S. Cl. ............................... 425/464; 425/382.4; 425/461; 264/177.12

[58] Field of Search ............................... 425/197-199, 425/190, 382.4, 192.2, 192.1, 380, 382 R, 461-467; 264/177.12, 176.1, 209.1, 209.8

[56] References Cited

U.S. PATENT DOCUMENTS

| | | | |
|---|---|---|---|
| 3,790,654 | 2/1974 | Bagley | 264/177.12 |
| 3,826,603 | 7/1974 | Wiley | 425/461 |
| 3,859,031 | 1/1975 | Hawkins | 425/461 |
| 4,242,075 | 12/1980 | Higuchi et al. | 425/463 |
| 4,343,604 | 8/1982 | Minjolle | 425/461 |
| 4,373,895 | 2/1983 | Yamamoto et al. | 425/461 |
| 4,376,747 | 3/1983 | Nazem | 425/461 |
| 4,384,841 | 5/1983 | Yamamoto et al. | 425/461 |
| 4,457,686 | 7/1984 | Rowland | 425/463 |
| 4,486,934 | 12/1984 | Reed | 29/163.5 R |
| 4,687,433 | 8/1987 | Ozaki et al. | 425/464 |

FOREIGN PATENT DOCUMENTS

| | | | |
|---|---|---|---|
| 0083850 | 7/1983 | European Pat. Off. . | |
| 0120716 | 10/1984 | European Pat. Off. . | |
| 51-68671 | 6/1976 | Japan | 425/461 |
| 57-61592 | 12/1982 | Japan . | |
| 59-46763 | 11/1984 | Japan . | |
| 59-53844 | 12/1984 | Japan . | |
| 61-63706 | 4/1986 | Japan | 425/461 |
| 7706501 | 12/1978 | Netherlands | 425/461 |
| 1160355 | 8/1969 | United Kingdom . | |

OTHER PUBLICATIONS

Soviet Inventions Illustrated, Sections P, Q, General/-Mechanical, 1981, Week D29, Derwent Publlications, Ltd., SU-776692, p. 51.

Soviet Inventions Illustrated, Sections P, Q, General/-Mechanical, 1979, Week B40, Derwent Publications Ltd., SU-642037, p. 51.

*Primary Examiner*—Jill L. Heitbrink
*Attorney, Agent, or Firm*—Arnold, White & Durkee

[57] ABSTRACT

An extrusion die for extruding ceramic honeycomb structural bodies includes body discharge channels having a desired honeycomb arrangement and independent body supply holes communicating with the body discharge channels. The body supply holes are so designed that each of them has inner peripheral surface zones of different inner dimensions and the inner peripheral surface zones may be coaxially arranged.

14 Claims, 4 Drawing Sheets

DIE FOR EXTRUDING HONEYCOMB STRUCTURAL BODIES

This is a continuation of application Ser. No. 06/942,408 field Dec. 16, 1986 now abandoned.

BACKGROUND OF THE INVENTION (1) Field of the Invention

The present invention relates to an extrusion die and a process for producing such an extrusion die. More particularly, the present invention relates to a honeycomb-shaped extrusion die adapted to extrude ceramic honeycomb structural bodies comprising body discharge channels and a plurality of independent body supply holes communicating with the body discharge channels as well as a process for producing the same. The extrusion die and the producing process thereof are characterized in that each of the body supply holes is so formed that the inner peripheral surface has different plural dimensions, thereby decreasing variations in the flow resistance of the body supply holes relative to a body passing therethrough.

(2) Related Art Statement

Ceramic honeycomb structural bodies have heretofore been used as catalyst carriers for purifying exhaust gases from internal combustion engines, fine particle-capturing filters, heat retainers, etc. The ceramic materials such as cordierite, alumina, silicon-carbide, mullite etc. There are known processes for producing the ceramic honeycomb structural bodies by extruding the ceramic material with use of an extrusion die.

For instance, conventional extrusion dies shown in FIGS. 3(A) and 3(B) are known (see U.S. Pat. No. 4,373,895, U.S. Pat. No. 3,790,654 and Japanese patent publication No. 57-61,592).

The conventional example (extrusion die 1) shown in FIG. 3(A) comprises a plurality of body supply holes 2 through which a body fed under pressurizing by a body feeder (not shown is passed, body stay zones 3 communicating with the body supply holes 2, and body discharge channels 4 having an arrangement corresponding to that of ceramic honeycomb structural bodies to be extruded (hereafter briefly referred to as "honeycomb structural bodies").

FIG. 3(B) is a partial sectional view of another conventional example. This example of FIG. 3(B) comprises a plurality of body supply holes 2 and body discharge channels 4 directly communicating with the body supply holes 2.

As is the same with the conventional examples in FIGS. 3(a) and 3(B), it is generally necessary to make uniform a flow rate of the body passing through the respective body supply holes 2 so that high quality honeycomb structural bodies may be extruded. For this demand, there are also known extrusion dies (not shown) in which a plate of noodle hole (Japanese patent publication No. 59-53,844) or a rectifier plate (Japanese patent publication No. 59-46,763) is provided on the side of the body supply holes.

In general, the body supply holes of the above conventional extrusion dies have a straight cylindrical shape. They are bored by drills. However, since hard metals such as die steel are used as the extrusion dies, such boring has poor workability. Further, there is a possibility that chips produced in the boring enters between the drill and a workpiece to make the roughness of the inner peripheral surface of the body supply hole coarse. Thus, the surface roughness differs among the inner peripheral surfaces of the respective body supply holes.

As mentioned in the foregoing, uniformalized flow resistance of a plurality of the body supply holes is an important requirement to produce high quality honeycomb structural bodies. When the inner diameter and the depth of the body supply holes are made constant, the flow resistance depends upon the roughness of the inner peripheral surface of the body supply holes. In addition, when the body supply holes are straight as in the case of the above-mentioned extrusion dies, the surface roughness so largely influences the flow resistance because the body supply holes are relatively small. Therefore, there arises large variations in flow resistance among the body supply holes of the conventional extrusion die. As a result, there exists an undesirable problem that it is difficult to manufacture honeycomb structural bodies of a high quality.

In order to remove the above-mentioned problem, the following countermeasures have conventionally been taken: For instance, the roughness of the inner peripheral surface is improved by honing or remaining after the body supply holes are bored. When the depth of the body supply holes is great, the surface roughness becomes further ununiform. In order to make the surface roughness of the body supply holes uniform, a die is divided into two die units, and slits and supply holes are machined in one of the die units, while only supply holes are formed in the other die unit. Then, they are bonded together. However, there occurs a problem that a manufacturing cost of the extrusion dies rises due to increased working steps.

SUMMARY OF THE INVENTION

The present invention is to solve the above-mentioned problems, and to provide extrusion dies in which the flow resistance of a plurality of body supply holes is made substantially uniform by a simple countermeasure as well as a process for producing the same.

According to a first aspect of the present invention, there is provision of an extrusion die for extruding ceramic honeycomb structural bodies, said extrusion die comprising body discharge channels having a desired honeycomb arrangement and independent body supply holes communicating with the body discharge channels, wherein the body supply holes are so designed that each of them may have a plurality of inner peripheral surface zones of different inner dimensions and said inner peripheral surface zones may be coaxially arranged.

According to another aspect of the present invention, there is a provision of a process for producing an extrusion die adapted to extrude ceramic honeycomb structural bodies, said extrusion dies comprising body discharge channels having a desired honeycomb arrangement and a plurality of independent body supply holes communicating with the body discharge channels, said process comprising the steps: of boring said body supply holes such that each of the body supply holes may have a plurality of coaxial inner peripheral surface zones of different inner dimensions, and said body supply holes may have a uniform flow resistance, and forming said body discharge channels which communicate with the body supply holes and have honeycomb arrangement corresponding to the ceramic honeycomb structural body to be extruded.

These and other objects, features and advantages of the invention will be well appreciated upon reading of the following description of the invention when taken in connection with the attached drawings with understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

Figure 2A:
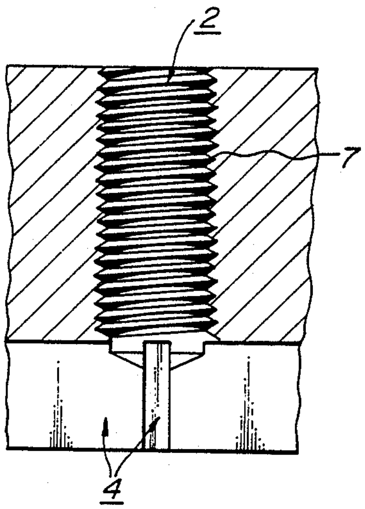
Figure 2B:
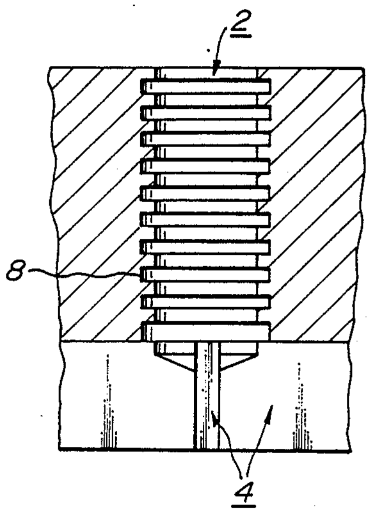
Figure 2C:
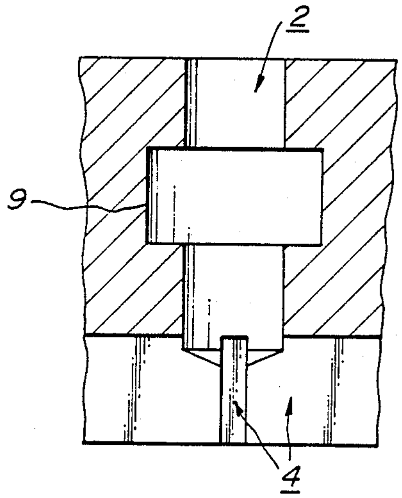
Figure 3A:
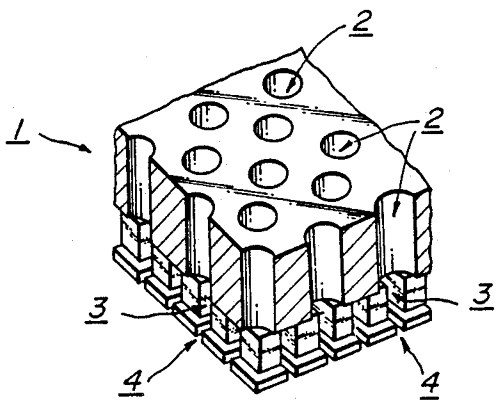
FIG 3A PRIOR ART
Figure 3B:
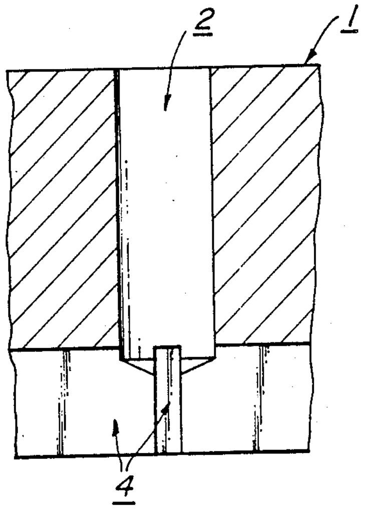
FIG 3B PRIOR ART

FIGS. 2(A) through 2(C) are sectional views of other embodiments of the extrusion die according to the present invention; and FIG. 3(A) and FIG. 3(B) are views illustrating conventional extrusion dies.

DETAILED DESCRIPTION OF THE INVENTION

Figure 1A:
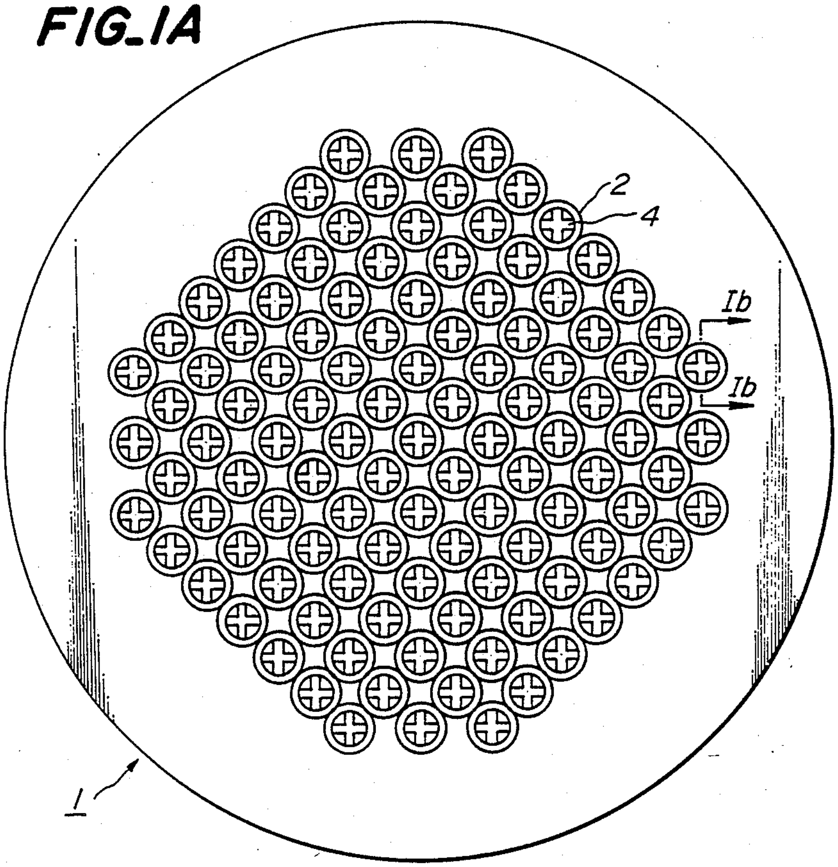
FIG. 1(A) is a plan view of an embodiment of the extrusion die according to the present invention.
Figure 1B:
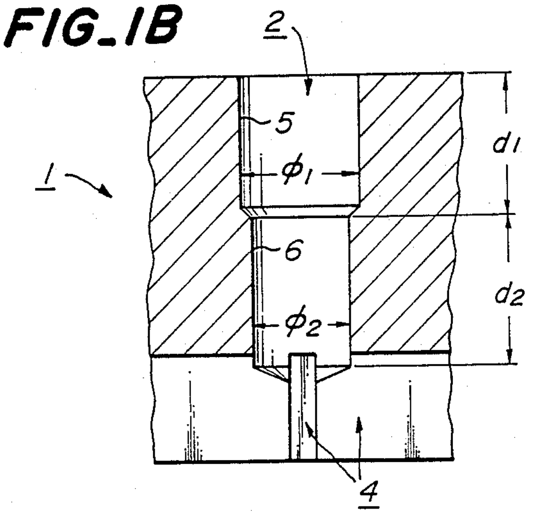
FIG. 1(B) is a sectional view of the embodiment in FIG. 1(A) taken along a line Ib—Ib.

As shown in FIGS. 1(A) and 1(B), the extrusion die according to the present invention is characterized by possessing, as a fundamental constituent feature, body supply holes so formed that each of the body supply holes may have a plurality of inner peripheral surface zones of different inner dimensions.

In the following, the extrusion die according to the present invention will be explained in more detail.

FIGS. 1(A) and 1(B) are views illustrating an embodiment of the extrusion die according to the present invention. FIG. 1(A) is a plan view thereof, and FIG. 1(B) is a sectional view taken along a line Ib—Ib in FIG. 1(A). A reference numeral 1 is an extrusion die, and reference numerals 2, 4, 5 and 6 denote a body supply hole, a body discharge channel, a first inner peripheral surface, and a second inner peripheral surface, respectively.

The fundamental constituent feature of the extrusion die 1 according to the present invention is that as in the embodiment of FIGS. 1(A) and 1(B), each of the body supply holes is constituted by a plurality of coaxial inner peripheral surface zones having different inner dimensions, that is, a first inner peripheral surface 5 having an inner diameter $\phi_1$ and a second inner peripheral surface 6 having an inner diameter of $\phi_2$. The body supply hole 2 is formed by first forming the first inner peripheral surface having the inner diameter of $\phi_1$ at a depth of $d_1$ by means of a drill and then forming the second inner peripheral surface 6 having the inner diameter of $\phi_2$ by means of another drill in such a depth of $d_2$ as to make it communicate with the body discharge channels 4.

As mentioned in the foregoing, the extrusion die according to the present invention is provided with the body supply holes each having a plurality of inner peripheral surface zones of different inner dimensions. Therefore, as compared with conventional extrusion dies having straight-shaped body supply holes, the flow resistance of the body supply holes in the extrusion die according to the present invention is far larger. Accordingly, even when some difference exists in roughness among the inner peripheral surfaces of the body supply holes in the extrusion die according to the present invention, influences of variations in the surface roughness upon the flow resistance can be almost ignored.

That is, according to the present invention, since the flow resistance of the body supply holes can be made substantially uniform, the honeycomb structural bodies of a high quality can be manufactured.

In addition, according to the present invention, it is possible to omit machining steps such as honing or reaming of the inner peripheral surfaces of the body supply holes for improving the surface roughness.

Next, the embodiments according to the present invention will be explained in greater detail with reference to the attached drawings.

In FIGS. 1(A) and 1(B) is illustrated an embodiment of the extrusion die according to the present invention, and FIGS. 2(A) through 2(C) illustrate other embodiments of the present invention.

The construction and function of the embodiment illustrated in FIGS. 1(A) and 1(B) have already been detailed, and therefore their explanation is omitted here. In the illustrated embodiment of FIGS. 1(A) and 1(B), the first inner peripheral surface 5 and the second inner peripheral surface 6 constituting the body supply hole 2 are so formed that their depths $d_1$ and $d_2$ may be substantially equal. But, it is preferable that the depths $d_1$ and $d_2$ are appropriately selected depending upon the shape, the cell density and the outer size of the honeycomb structural body. For instance, when the honeycomb structural body has a high cell density and/or a large outer size, $d_1$ is preferably smaller than $d_2$ so as to assure the strength of the extrusion die.

Then, the process for producing the embodiment illustrated in FIGS. 1(A) and 1(B) will be explained in comparison with processes for producing the conventional extrusion dies explained in "Background of the Invention".

The conventional extrusion dies are produced by boring a plurality of body supply holes in a die material worked in a desired shape from one working surface thereof by a drill, and forming the body discharge channels in a desired honeycomb arrangement from the other working surface to communicate with the body supply holes by a well-known discharge working method or a thin blade cutter. In such a conventional producing process, since the body supply holes are formed in a straight fashion, limitation is imposed upon the machining depth [$(d_1+d_2)$ shown in FIG. 1(B)] in relation to the diameter of the drills used. If it exceeds the limitation, it becomes difficult to remove cut chips. Owing to this, the roughness of the inner peripheral surface of the body supply holes becomes coarse and ununiform. When the machined holes curve, the body supply holes deviate on the body discharge side to make the conformity between the body supply holes and the body discharge channels poorer.

To the contrary, the producing process according to the present invention is to settle the above-mentioned problems. That is, as shown in FIG. 1(B), holes of an inner diameter of $\phi_1$ (the first inner peripheral surface 5) are bored at a specific depth of $d_1$ by a drill. Then, holes having an inner diameter of $\phi_2$ ($\phi_2 < \phi_1$) (the second inner peripheral surface 6) are similarly drilled coaxially with the central axis of the first inner peripheral surface 5, thereby forming body supply holes 2. Thereafter, an intended extrusion die is produced by forming body discharge channels 4 having a desired honeycomb arrangement according to the discharge working process or a thin blade cutter to communicate with the body supply holes.

According to the producing process of the present invention, since the body supply holes 2 are bored at two separate stages of forming the holes of the depth of $d_1$ and the depth of $d_2$, chips are easily removed. Thus, the body supply holes 2 which are free from occurrence of flaws at the inner peripheral surfaces due to the chips can be stably obtained. Further, since the body supply hole is constituted by the first and second inner peripheral surfaces 5 and 6 having the different inner dimensions, the intrinsic flow resistance becomes larger. Thus, influences of the roughness of the inner peripheral surfaces (the first and second inner peripheral surfaces 5 and 6 in the embodiment shown in FIGS. 1(A) and 1(B)) of the body supply holes upon the flow resistance can be ignored. In conclusion, the extrusion die which has uniformalized flow resistance of the body supply holes 2 and allows the extrusion of the honeycomb structural bodies of a high quality can be produced.

In order to further facilitate removal of chips produced in the boring of the body supply holes 2, the following producing process may be used. That is, first tentative holes smaller than the intended inner dimensions $\phi_1$ and $\phi_2$ are bored, and body discharge channels are machined to communicated with the tentative holes. Then, given supply holes are machined in the above-mentioned way. The body discharge channels 4 are not necessarily machined in a desired honeycomb arrangement just subsequent to the boring of the tentative body supply holes, but preliminary body discharge channels have only to communicate therewith. As a matter of course, the body discharge channels 4 having the desired honeycomb arrangement are machined after the body supply holes 2 are bored.

In the above, the embodiment in FIGS. 1(A) and 1(B) including the body supply holes 2 each constituted by the first inner peripheral surface 5 and the second inner pripheral surface 6 and the process for producing the same have been explained. The body supply holes may be designed to have three or more inner peripheral surface zones of different inner dimensions. In the embodiment of FIGS. 1(A) and 1(B), the body supply holes are of a so-called cylindrical shape, but they may be designed in a shape (for instance, rectangular section) other than the cylindrical shape.

As having been described in the foregoing, according to the extrusion die of the present invention, the intrinsic flow resistance of the body supply holes is increased by providing a stepped portion or step portions in the inner peripheral surface of each of the body supply holes, so that the influences of the roughness of the inner peripheral surfaces of the body supply holes upon the flow resistance can be substantially ignored. In other words, the honeycomb structural bodies having a high quality can be extruded by making the flow resistance of the body supply holes formed in the extrusion die uniform. The similar effects in the embodiment of FIGS. 1(A) and 1(B) can be exhibited by the embodiments illustrated in FIGS. 2(A) through 2(C).

In the embodiment of FIG. 2(A), a plurality of inner peripheral surface zones of body supply holes 2 are constituted by so-called threads 7.

In the embodiment of FIG. 2(B), a plurality of parallel grooves are formed in the inner peripheral surfaces of the body supply holes 2.

In the embodiment of FIG. 2(C), a recess 9 is formed in the inner peripheral surface of each of the body supply holes 2. The extrusion dies illustrated in FIGS. 2(B) and 2(C) may be used by bonding technique (That is, for instance, an extrusion die is formed by bonding a die unit having first holes with another die unit having second holes such that the first and second holes may be axially arrayed).

Although the embodiments illustrated in FIGS. 1(A) and 1(B) and FIGS. 2(A) through 2(C) have been explained, the present invention is not limited thereto. The extrusion die according to the present invention may be constituted by combining the techniques in these embodiments.

As having been detailed in the foregoing, the present invention allows manufacturing of the ceramic honeycomb structural bodies of a high quality because the flow resistance of the body supply holes is made uniform while the influence of the roughness of the inner peripheral surfaces of the body supply holes being avoided. Besides, since a machining step for improving the roughness of the inner peripheral surface of the body supply holes can be omitted, the working steps are simplified and manufacturing cost can be reduced.

What is claimed is:

1. An extrusion die for forming ceramic honeycomb structural bodies from a mass of ceramic material, comprising:

an extrusion die body having an entrance surface and an exit surface, said surfaces being located on opposite parallel sides of said die body;

discharge channels formed in said exit surface, said channels being defined by a plurality of intersecting slits which form a matrix corresponding to the geometrical configuration of the honeycomb structural body to be formed thereby, such that said geometric configuration of said honeycomb structural body is formed solely by said discharge channels; and a plurality of independent body supply holes formed in said entrance surface and extending into the die body from said entrance surface in a direction substantially normal to said entrance surface and directly communicating with said discharge channels, each of said body supply holes having at least two different, coaxially arranged, inner peripheral surface zones, said plurality of independent body supply holes being the first point at which said mass of ceramic material is separated while entering said extrusion die;

wherein the cross-sectional shapes of the body supply holes in each surface zone are substantially the same, and the cross-sectional dimensions of the body supply holes in axially adjacent surface zones are substantially different.

2. An extrusion die according to claim 1, wherein the cross-sectional dimension of one of the at least two inner peripheral surface zones proximate said exit surface is smaller than the cross-sectional dimension of one of the at least two inner peripheral surface zones proximate said entrance surface.

3. An extrusion die according to claim, 1 wherein the cross-sectional shapes of said body supply holes are round.

4. An extrusion die according to claim 2, wherein the cross-sectional shapes of said body supply holes are round.

5. An extrusion die according to claim 1, wherein the cross-sectional dimensions of the body supply holes vary continuously from said entrance surface towards said exit surface.

6. An extrusion die according to claim 2, wherein the cross-sectional dimensions of the body supply holes vary continuously from said entrance surface towards said exit surface.

7. An extrusion die according to claim 3, wherein the cross-sectional dimensions of the body supply holes vary continuously from said entrance surface towards said exit surface.

8. An extrusion die according to claim 4, wherein the cross-sectional dimensions of the body supply holes vary continuously from said entrance surface towards said exit surface.

9. An extrusion die according to claim 1, wherein the cross-sectional shapes of said body supply holes are polygonal.

10. An extrusion die according to claim 2, wherein the cross-sectional shapes of said body supply holes are polygonal.

11. An extrusion die according to claim 1, wherein the cross-sectional dimensions of adjacent inner peripheral surface zones of the body supply holes are different, and the cross-sectional dimensions of alternate inner peripheral surface zones are substantially the same.

12. An extrusion die according to claim 2, wherein the cross-sectional dimensions of adjacent inner peripheral surface zones of the body supply holes are different, and the cross-sectional dimensions of alternate inner peripheral surface zones are substantially the same.

13. An extrusion die according to claim 3, wherein the cross-sectional dimensions of adjacent inner peripheral surface zones of the body supply holes are different, and the cross-sectional dimensions of alternate inner peripheral surface zones are substantially the same.

14. An extrusion die according to claim 4, wherein the cross-sectional dimensions of adjacent inner peripheral surface zones of the body supply holes are different, and the cross-sectional dimensions of alternate inner peripheral surface zones are substantially the same.

* * * * *

UNITED STATES PATENT AND TRADEMARK OFFICE
CERTIFICATE OF CORRECTION

PATENT NO. : 4,883,420

DATED : November 28, 1989

INVENTOR(S) : Sei Ozaki, Aichi; Satoru Inoue, Hazu; Shoji Futamura, Kawasaki, all of Japan It is certified that error appears in the above-identified patent and that said Letters Patent is hereby corrected as shown below:

On the title page, change the Assignee from "NGK Insulators, Ltd., Nagoya Japan" to --NGK Insulators, Ltd., Nagoya Japan and INSTITUTE OF TECHNOLOGY PRECISION ELECTRICAL DISCHARGE WORKS--.

Signed and Sealed this

Twenty-sixth Day of February, 1991

*Attest:*

HARRY F. MANBECK, JR.

*Attesting Officer*

*Commissioner of Patents and Trademarks*